United States Patent
Kawahira et al.

(10) Patent No.: US 12,204,197 B2
(45) Date of Patent: Jan. 21, 2025

(54) COLOR FILTER AND LIQUID CRYSTAL DISPLAY DEVICE

(71) Applicant: Sharp Display Technology Corporation, Kameyama (JP)

(72) Inventors: Yuichi Kawahira, Kameyama (JP); Masahiro Hasegawa, Kameyama (JP); Ryosuke Saigusa, Kameyama (JP); Jianeng Xu, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/595,844

(22) Filed: Mar. 5, 2024

(65) Prior Publication Data

US 2024/0345434 A1   Oct. 17, 2024

(30) Foreign Application Priority Data

Apr. 14, 2023  (JP) .................................. 2023-066509

(51) Int. Cl.
  *G02F 1/1335*  (2006.01)
  *G02F 1/1333*  (2006.01)
(52) U.S. Cl.
  CPC .. *G02F 1/133519* (2021.01); *G02F 1/133388* (2021.01); *G02F 1/133512* (2013.01); *G02F 1/133514* (2013.01)

(58) Field of Classification Search
  CPC ......... G02F 1/133388; G02F 1/133512; G02F 1/133514
  See application file for complete search history.

(56) References Cited

U.S. PATENT DOCUMENTS

2018/0198096 A1* 7/2018 Yasuda ................. G02F 1/1333
2019/0155115 A1* 5/2019 Sakamoto ............. G02F 1/1343

FOREIGN PATENT DOCUMENTS

JP       2016-156890 A     9/2016

* cited by examiner

*Primary Examiner* — Jessica M Merlin
(74) *Attorney, Agent, or Firm* — ScienBiziP, P.C.

(57) ABSTRACT

A color filter includes a frame portion in which the reflectance of light incident from the transparent substrate side is less than the reflectance of light incident from the overcoat layer side and an opening portion in which the reflectance of light incident from the transparent substrate side is greater than the reflectance of light incident from the overcoat layer side. The color filter satisfies $n_{bc} \times d_{bc} < \alpha \times A^2 + \beta \times A + \gamma$, where $n_{bc}$ is the refractive index of the transparent base coat layer, $d_{bc}$ nm is the film thickness of the transparent base coat layer, and A is the opening ratio of the color filter, and where A, $\alpha$, $\beta$, and $\gamma$ respectively satisfy A=(area of the opening portion)/(area of an active area), $\alpha=436.7 \times n_{bc} - 837.2$, $\beta=-315.8 \times n_{bc} + 523.7$, and $\gamma=-358.3 \times n_{bc} + 771.8$.

5 Claims, 8 Drawing Sheets

COLOR FILTER AND LIQUID CRYSTAL DISPLAY DEVICE

CROSS-REFERENCE TO RELATED APPLICATIONS

This application claims the benefit of priority to Japanese Patent Application Number 2023-066509 filed on Apr. 14, 2023. The entire contents of the above-identified application are hereby incorporated by reference.

BACKGROUND

1. Field

The present disclosure relates to a color filter and a liquid crystal display device.

2. Description of the Related Art

A liquid crystal display device is a display device that uses a liquid crystal composition for display. A typical display method of the liquid crystal display is a method including: emitting light from a backlight toward a liquid crystal panel in which a liquid crystal composition is enclosed between a color filter and a counter substrate; changing the orientation of liquid crystal molecules by applying a voltage to the liquid crystal composition; and thereby controlling the amount of light that passes through the liquid crystal panel. Having advantages of low profile, lightweight, and low power consumption, such a liquid crystal display device is used for electronic apparatuses such as a television set, a smartphone, a tablet terminal, a car navigation system, and the like.

Display by a liquid crystal display device has a problem in that it is easily affected by external light and the viewability decreases due to external light reflection, and external light reflection mainly occurs in a color filter that is nearest to external light. A general color filter includes a transparent substrate, a light-blocking layer (black matrix) that is formed in a pattern on the transparent substrate and contains a black colorant and a binder resin, and a color resist layer (color filter layer) formed in an opening portion of the light-blocking layer. One of the causes of external light reflection is that the refractive index of the light-blocking layer is higher than refractive index of the transparent substrate and the difference between the refractive indices is large.

Therefore, it has been proposed to form, between the transparent substrate and the light-blocking layer, a refractive-index-adjusting layer that contains a resin whose refractive index is higher than that of the transparent substrate and lower than that of the light-blocking layer (Japanese Unexamined Patent Application Publication No. 2016-156890). According to Japanese Unexamined Patent Application Publication No. 2016-156890, by providing, between the transparent substrate and the light-blocking layer, a layer whose refractive index is adjusted to be between that of the transparent substrate and that of the light-blocking layer, it is possible to reduce external light reflection because of the interference effect of light and it is possible to suppress decrease of contrast.

However, reduction of external light reflection is not sufficient even with the color filter described in Japanese Unexamined Patent Application Publication No. 2016-156890, and a color filter that can further reduce external light reflection is in demand.

Against the above background, it is desirable to provide a color filter with which external light reflection is reduced and that has high viewability and a liquid crystal display device including the color filter.

SUMMARY

According to a first aspect of the disclosure, there is provided a color filter including a transparent substrate, a transparent base coat layer stacked on the transparent substrate, a light-blocking layer partially stacked on the transparent base coat layer, a color resist layer stacked on the light-blocking layer and on the transparent base coat layer in a region in which the light-blocking layer is not present, and an overcoat layer stacked on the light-blocking layer and on the color resist layer. The color filter includes a frame portion in which the transparent base coat layer and the light-blocking layer are stacked on the transparent substrate and the color resist layer is not stacked, and an opening portion in which the transparent base coat layer and the color resist layer are stacked on the transparent substrate and the light-blocking layer is not stacked. In the frame portion, a reflectance of light incident from the transparent substrate side is less than a reflectance of light incident from the overcoat layer side. In the opening portion of at least one color in the color resist layer, a reflectance of light incident from the transparent substrate side is greater than a reflectance of light incident from the overcoat layer side. The color filter satisfies the following expression (1)

$$n_{bc} \times d_{bc} < \alpha \times A^2 + \beta \times A + \gamma \tag{1}$$

where $n_{bc}$ is a refractive index of the transparent base coat layer, $d_{bc}$ nm is a film thickness of the transparent base coat layer, and A is an opening ratio of the color filter, and where A, α, β, and γ respectively satisfy the following expressions $A$ = (area of the opening portion)/(area of an active area), $\alpha = 436.7 \times n_{bc} - 837.2$, $\beta = -315.8 \times n_{bc} + 523.7$, and $\gamma = -358.3 \times n_{bc} + 771.8$.

According to a second aspect of the disclosure, the color filter according to the first aspect, wherein the refractive index of the transparent base coat layer is greater than or equal to 1.71 and less than or equal to 1.83.

According to a third aspect of the disclosure, the color filter according to the first or second aspect, wherein the transparent base coat layer contains silicon oxynitride or silicon nitride.

According to a fourth aspect of the disclosure, the color filter according to any one of the first to the third aspects, wherein a refractive index of the light-blocking layer is greater than or equal to 1.76 and less than or equal to 1.80.

According to a fifth aspect of the disclosure, a liquid crystal display device comprises the color filter according to any one of the first to fourth aspects.

DESCRIPTION OF THE EMBODIMENTS

Hereafter, a color filter and a liquid crystal display device according to embodiments of the present disclosure will be described. The present disclosure is not limited to the contents described in the following embodiments and can be modified in design as appropriate, as long as the modification satisfies the configuration of the present disclosure.

Figure 1:
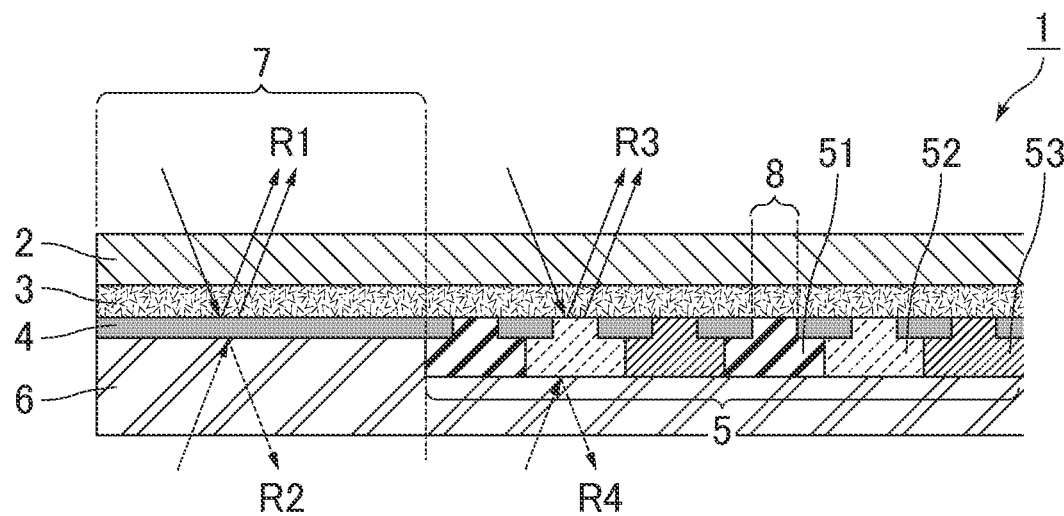
FIG. 1 is a schematic sectional view of an example of a color filter according to an embodiment of the present disclosure.

FIG. 1 is a schematic sectional view of an example of the color filter according to an embodiment of the present disclosure. A color filter 1 according to the embodiment of the present disclosure has a structure such that: a transparent base coat layer 3 and a light-blocking layer 4, which is partially stacked, are stacked on a transparent substrate 2; and a color resist layer 5, including a red color resist layer 51, a green color resist layer 52, a blue color resist layer 53, and the like, is stacked in regions in which the light-blocking layer is not present due to patterning and on the light-blocking layer 4. Moreover, an overcoat layer 6 for smoothing a stack surface is provided on the light-blocking layer 4 and the color resist layer 5. Furthermore, the color filter according to the embodiment of the present disclosure includes a frame portion 7 in which the transparent base coat layer 3 and the light-blocking layer 4 are stacked on the transparent substrate 2 and the color resist layer 5 is not stacked, and an opening portion 8 in which the transparent base coat layer 3 and the color resist layer 5 are stacked on the transparent substrate 2 and the light-blocking layer 4 is not stacked. It is possible to make the color filter according to the embodiment of the present disclosure be a color filter with which external light reflection is reduced and that has high viewability by setting the ratio of the area of the opening portion 8 to the area of an active area (a region in which the color resist layer 5 is formed), that is, the opening ratio and the refractive index and the film thickness of the transparent base coat layer 3 to satisfy an expression described below.

In the color filter according to the embodiment of the present disclosure, in the frame portion, the reflectance (hereafter, also referred to as R1) of light incident from the transparent substrate side is less than the reflectance (hereafter, also referred to as R2) of light incident from the overcoat layer side; and, in the opening portion of at least one color in the color resist layer, the reflectance (hereafter, also referred to as R3) of light incident from the transparent substrate side is greater than the reflectance (hereafter, also referred to as R4) of light incident from the overcoat layer side.

It is possible to make the color filter be a color filter that has high viewability by causing, in the frame portion 7 of FIG. 1, the reflectance R1 of light incident from the transparent substrate 2 side to be less than the reflectance R2 of light incident from the overcoat layer 6 side, and by causing, in the opening portion 8 of any of subpixels of FIG. 1, the reflectance R3 of light incident from the transparent substrate 2 side to be greater than the reflectance R4 of light incident from the overcoat layer 6 side, that is, by causing R1<R2 and R3>R4 to be satisfied. Note that, in the present specification, "reflectance" refers to reflectance of light having a wavelength of 550 nm. Hereafter, regarding the color filter, a surface direction of the transparent substrate in which a light-blocking layer is not stacked may be referred to as "substrate side" and a surface direction of the transparent substrate in which a light-blocking layer is stacked may be referred to as "film-surface side".

Figure 2:
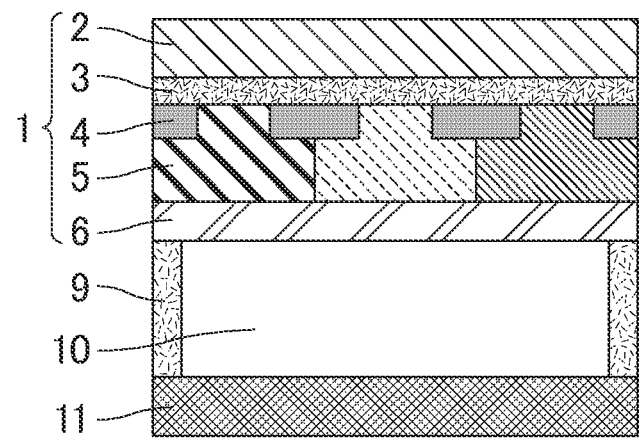
FIG. 2 is a sectional view of a measurement sample used to measure the reflectance of a frame portion and the reflectance of an opening portion.

The reflectance can be measured, for example, by using the following method. FIG. 2 is a sectional view of a measurement sample used to measure the reflectance of the frame portion and the reflectance of the opening portion. The measurement sample has a configuration such that a black acrylic plate 11 is disposed, via matching oil 10 and a photospacer 9, under the color filter 1 including the transparent substrate 2, the transparent base coat layer 3, the light-blocking layer 4, the color resist layer 5, and the overcoat layer 6. By disposing the matching oil 10 and the black acrylic plate 11 under the color filter, it is possible to suppress the effect of reflection from a place where the color filter is set, such as a desk. For the measurement sample that has been made so as to have the above configuration, the reflectance of the frame portion and the reflectance of the opening portion of the color filter are measured by using a micro-spectrophotometer (OSP-SP200 made by Olympus Corporation or its equivalent). The measurement is performed for each of a surface (substrate side) such that the transparent substrate 2 of the color filter is on the light source side and a surface (film surface side) such that the overcoat layer 6 of the color filter is on the light source side. As the matching oil, a substance having a refractive index of approximately 1.5, which is specifically glycerin or the like, is selected.

The color filter according to the embodiment of the present disclosure satisfies the following expression (1)

$$n_{bc} \times d_{bc} < \alpha \times A^2 + \beta \times A + \gamma \tag{1}$$

where $n_{bc}$ is the refractive index of the transparent base coat layer, $d_{bc}$ nm is the film thickness of the transparent base coat layer, and A is the opening ratio of the color filter, and where A, $\alpha$, $\beta$, and $\gamma$ respectively satisfy the following expressions $A$ = (area of the opening portion)/(area of an active area), $\alpha = 436.7 \times n_{bc} - 837.2$, $\beta = -315.8 \times n_{bc} + 523.7$, and $\gamma = -358.3 \times n_{bc} + 771.8$.

In the present specification, "active area" refers to a portion where a color resist layer is stacked, that is, a portion of the color filter excluding the frame portion. Moreover, in the present specification, "refractive index" refers to the refractive index of light having a wavelength of 550 nm.

Color filters that have been proposed, such as the color filter described in Japanese Unexamined Patent Application Publication No. 2016-156890, suppress reflection light by causing interference of reflected light by providing, between the transparent substrate and the light-blocking layer, a refractive-index-adjusting layer whose refractive index is between that of the transparent substrate and that of light-blocking layer, and by causing the refractive-index-adjusting layer to have a film thickness of ¼ wavelength. With a color filter having such a structure, it is possible to reduce reflection light in a portion having a structure of "(transparent substrate)/(refractive-index-adjusting layer)/(light-blocking layer)", that is, the frame portion. However, in the opening portion in which the color resist layer is stacked instead of the light-blocking layer, the reflectance may conversely become high due to the presence of the refractive-index-adjusting layer. Thus, the color filter has a problem in that external light reflection of the entirety of the color filter is not reduced as expected. Although it may be possible to address the problem by patterning the refractive-index-adjusting layer to form the refractive-index-adjusting layer in such a way as to avoid the opening portion. However, this has a problem in that it is technically difficult and the productivity also decreases. With the color filter according to the embodiment of the present disclosure, by adjusting the opening ratio of the color filter and the refractive index and the film thickness of the transparent base coat layer to satisfy the expression (1), it is possible to make the color filter be a color filter with which external light reflection is reduced and that has high viewability even when the transparent base coat layer is present in the opening portion.

In the color filter according to the embodiment of the present disclosure, the difference between the right-hand side and the left-hand side of the expression (1), that is, $(\alpha \times A^2 + \beta \times A + \gamma) - (n_{bc} \times d_{bc})$ may be greater than 0 nm. When the difference between the right-hand side and the left-hand side of the expression (1) is in the above range, it is possible to further suppress external light reflection. The difference between the right-hand side and the left-hand side of the expression (1) is preferably greater than or equal to 20 nm and more preferably greater than or equal to 40 nm. The upper limit of the difference between the right-hand side and the left-hand side of the expression (1), which is not particularly limited, is approximately 140 nm due to a design constraint on the opening ratio and the refractive index and the film thickness of the base coat layer.

The opening ratio may be greater than or equal to 35%. When the opening ratio is greater than or equal to 35%, it is possible to make the liquid crystal display device be a liquid crystal display device with higher brightness and lower power consumption. The opening ratio is preferably greater than or equal to 45% and more preferably greater than or equal to 60%. The upper limit of the opening ratio, which is not particularly limited, is approximately 70% in view of manufacturing technology.

The transparent substrate is not particularly limited and may be any appropriate substrate known to date in the field of liquid crystal display devices. Examples of the transparent substrate include an inorganic substrate such as a glass substrate and a resin substrate such as a transparent resin substrate.

The transparent base coat layer has a function of reducing external light reflection by adjusting the refractive index difference between the transparent substrate and the light-blocking layer. The "transparent base coat layer" refers to a layer that is interposed between the transparent substrate and the light-blocking layer or the color resist layer, and may include a plurality of layers made of different materials. The material of the transparent base coat layer may be any appropriate material that is transparent and satisfies the expression (1). Examples of material that can easily satisfy the expression (1) include silicon oxynitride, silicon nitride, and aluminum oxide. Among these, to further suppress external light reflection, the transparent base coat layer may contain silicon oxynitride or silicon nitride. Here, "transparent" means that the transmittance of a single film is greater than or equal to 80% in the visible wavelength range (380 nm to 780 nm).

The refractive index of the transparent base coat layer is not particularly limited, as long as the expression (1) is satisfied. However, to further suppress external light reflection, the refractive index may be greater than or equal to 1.71 and less than or equal to 1.83. Examples of the material of the transparent base coat layer having such a refractive index include silicon oxynitride and silicon nitride.

The thickness of the transparent base coat layer is appropriately adjusted so that the expression (1) is satisfied. To further suppress external light reflection, the thickness is preferably greater than or equal to 10 nm, more preferably greater than or equal to 20 nm, and further preferably greater than or equal to 30 nm, and preferably less than or equal to 80 nm and more preferably less than or equal to 50 nm.

The light-blocking layer is a layer that is formed in a pattern that separates adjacent color resist layers from each other by exposing a photoresist (photosensitive resin) to light and then developing the photoresist. The light-blocking layer may be, for example, a black matrix (BM) that is formed in a grid pattern by photolithography. The photoresist may be a positive photoresist or may be a negative photoresist.

The material of the light-blocking layer is not particularly limited, as long as the relationships among R1 to R4 are satisfied, and may be, for example, a resin including a pigment. Examples of the pigment include a carbon black pigment and a titanium black pigment. Among these, the pigment may be a titanium black pigment, which can easily satisfy the relationships among R1 to R4. Examples of the resin include epoxy resin, acrylic resin, epoxy acrylate resin, and polyimide resin. Among these, the resin may be acrylic resin, which can easily satisfy the relationships among R1 to R4.

The refractive index of the light-blocking layer is not particularly limited, as long as the relationships among R1 to R4 are satisfied. For example, the refractive index may be greater than or equal to 1.76 and less than or equal to 1.80.

Examples of the material of the color resist layer include a resin including a pigment (color resist). The combination of colors in the color resist layer is not limited to a combination of red color, green color, and blue color. The combination may be, for example, a combination of red color, green color, blue color, and yellow color.

The overcoat layer has a function of suppressing elution of impurities in the color resist layer to another layer and smoothing protrusions and recesses generated due to the light-blocking layer and the color resist layer. For the material of the overcoat layer, a transparent resin is appropriate. Specific examples of the material include acrylic resin, polyimide resin, and epoxy resin.

The refractive index of the overcoat layer is not particularly limited, as long as the relationships among R1 to R4 are satisfied. For example, the refractive index may be greater than or equal to 1.40 and less than or equal to 1.60.

The thickness of the transparent base coat layer is not particularly limited. However, to further reduce the risk of color mixture in an oblique view, the thickness may be greater than or equal to 1.0 m and less than or equal to 2.0 m.

By using the color filter according to the embodiment of the present disclosure, it is possible to obtain a liquid crystal display device with which external light reflection is reduced and that has high viewability.

Such a liquid crystal display device including the color filter according to the embodiment of the present disclosure is also an embodiment of the present disclosure.

An example of the liquid crystal display device according to the embodiment of the present disclosure is a liquid crystal display device including a color filter, a counter substrate facing the color filter, and a liquid crystal layer disposed between the color filter and the counter substrate.

As the color filter, an equivalent of the color filter according to the embodiment of the present disclosure can be used.

The counter substrate is not particularly limited, as long as the counter substrate is disposed to face the color filter and holds a liquid crystal layer between the color filter and the counter substrate. For example, an active-matrix substrate known to date in the field of liquid crystal display devices may be used.

Hereafter, the present disclosure will be described in further detail by using Examples. However, the present disclosure is not limited by these Examples.

EXAMPLE 1

(1) Making of Color Filter

Figure 3:
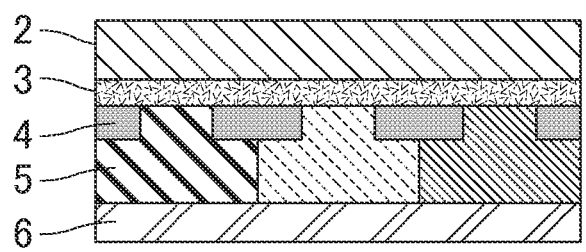
FIG. 3 is a schematic sectional view of a color filter made in Examples.

As the transparent substrate, a glass substrate (refractive index (550 nm): 1.55) having a thickness of 0.5 mm was prepared. Next, as the transparent base coat layer, a layer of SiON (refractive index (550 nm): 1.71) having a thickness of 40 nm was stacked on the glass substrate by using a CVD (chemical vapor deposition) apparatus. Subsequently, the light-blocking layer and the color resist layer were formed by using a mask for a color filter having an opening ratio of 35% (A=0.35), the overcoat layer was formed on the light-blocking layer and the color resist layer, and thus the color filter was made. FIG. 3 is a schematic sectional view of the color filter that was made. Resin A of the light-blocking layer was a resin in which 50 parts by weight of a titanium black material and 50 parts by weight of an acrylic resin were mixed and kneaded, and the refractive index of the resin A was 1.76 at a wavelength of 550 nm. The resist layers for the colors included in the color resist layer respectively had the following refractive indices at the wavelength 550 nm: 1.64 (red-color resist layer), 1.59 (green-color resist layer), and 1.52 (blue-color resist layer). The thickness of each resist layer in the opening portion was 2.0 m. An acrylic resin (refractive index (550 nm): 1.49) was used for the overcoat layer, and the thickness of the overcoat layer was 1.5 m.

(2) Measurement of Microreflectance of Color Filter

By using the obtained color filter, a measurement sample having a configuration illustrated in FIG. 2 was made. As the black acrylic plate 11, an acrylic plate having a refractive index of 1.49 at 550 nm was used. As the matching oil 10, glycerin was used. The height (thickness) of the photospacer 9 was 3.05 m. Next, the microreflectance of the frame portion and the microreflectance of the opening portion of the obtained measurement sample were measured by using a micro-spectrophotometer (OSP-SP200 made by Olympus Corporation). The reflectance of the opening portion was measured for each color of the color resist layer. Subsequently, a measurement sample was made so that the film-surface side of the color filter 1 became the light-source side, and the microreflectance of the frame portion and the microreflectance of the opening portion were measured in the same way. Table 1 shows the results.

(3) Measurement of Internal Reflectance of Color Filter

For the measurement sample in which the transparent substrate was on the light-source side, the reflectance of the color filter was measured by using a spectrophotometer (CM-2600d, made by KONICA MINOLTA, INC.) under the SCI (specular component include) condition. Next, a measurement sample in which only a glass substrate was used instead of the color filter was made, and the reflectance was measured in the same way as with the color filter. The reflectance was regarded as the surface reflectance of the glass substrate, and the internal reflectance of the color filter was calculated by subtracting the surface reflectance of the glass substrate from the reflectance of the color filter. Table 1 shows the results. In measurement of reflectance by using a spectrophotometer, two types of reflectance, which are SCE reflectance excluding specular reflection component and SCI reflectance including specular reflection component, may be obtained. In the present specification, SCI reflectance is used.

(4) Measurement of Internal Reflectance of Liquid Crystal Panel

Figure 4:
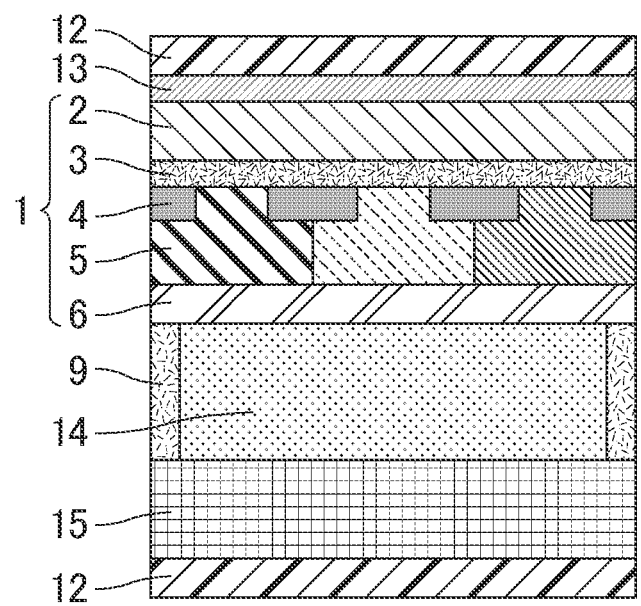
FIG. 4 is a schematic sectional view of a liquid crystal panel made in Examples.
Figure 5:
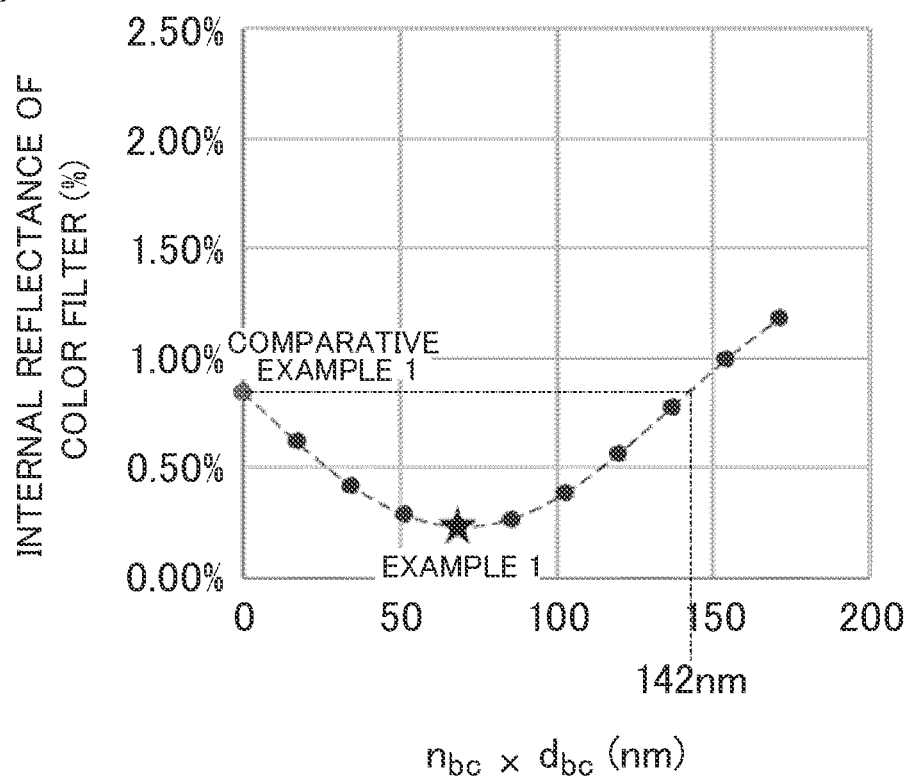
FIG. 5 is graph of the internal reflectance of a color filter when the thickness of a transparent base coat layer was changed under the condition of a color filter made in Example 1.
Figure 6:
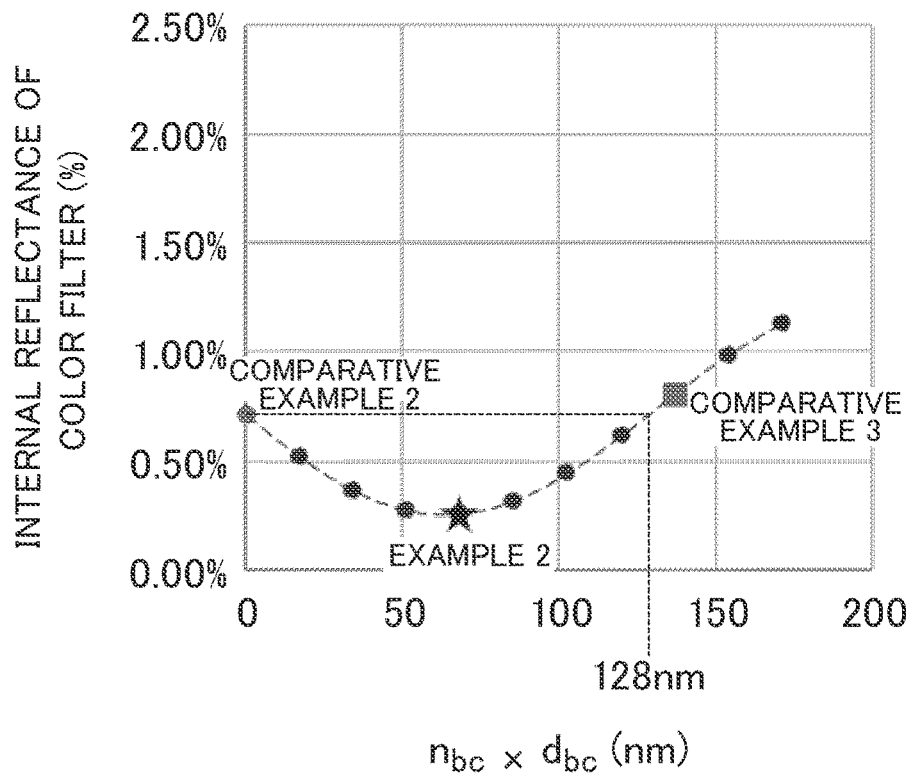
FIG. 6 is graph of the internal reflectance of a color filter when the film thickness of a transparent base coat layer was changed under the condition of a color filter made in Example 2.
Figure 7:
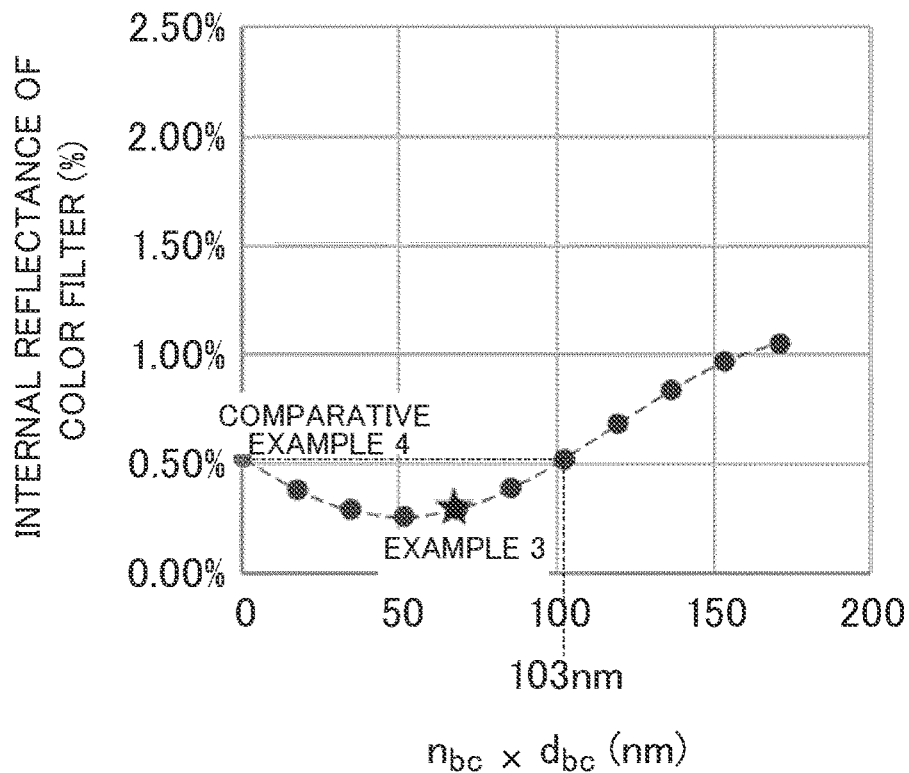
FIG. 7 is graph of the internal reflectance of a color filter when the thickness of a transparent base coat layer was changed under the condition of a color filter made in Example 3.
Figure 8:
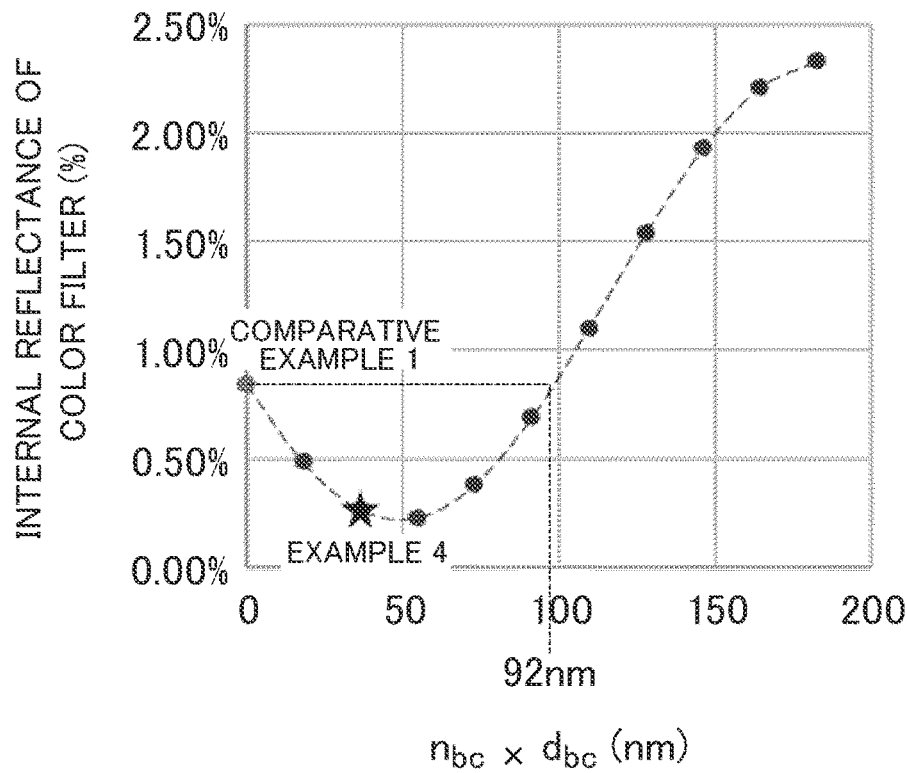
FIG. 8 is graph of the internal reflectance of a color filter when the thickness of a transparent base coat layer was changed under the condition of a color filter made in Example 4.
Figure 9:
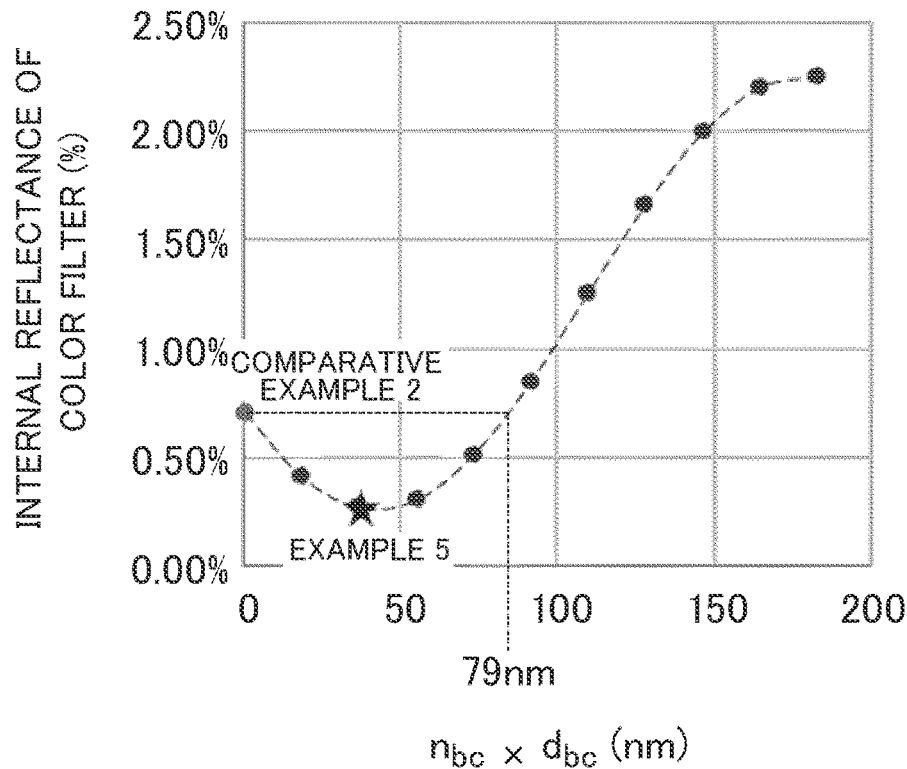
FIG. 9 is graph of the internal reflectance of a color filter when the thickness of a transparent base coat layer was changed under the condition of a color filter made in Example 5.
Figure 10:
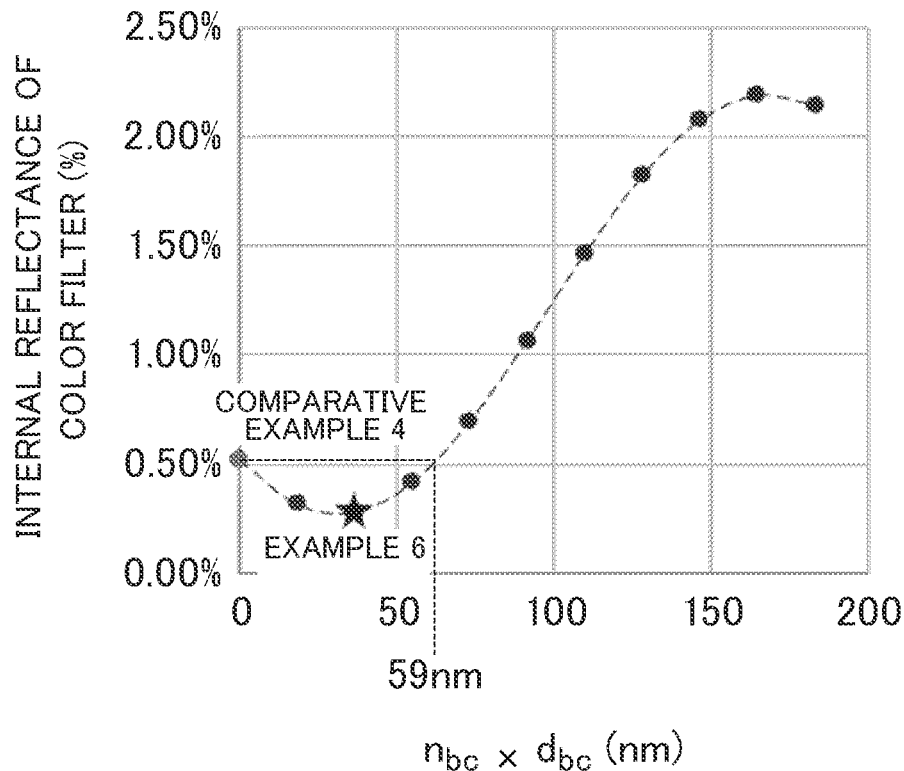
FIG. 10 is graph of the internal reflectance of a color filter when the thickness of a transparent base coat layer was changed under the condition of a color filter made in Example 6.
Figure 11:
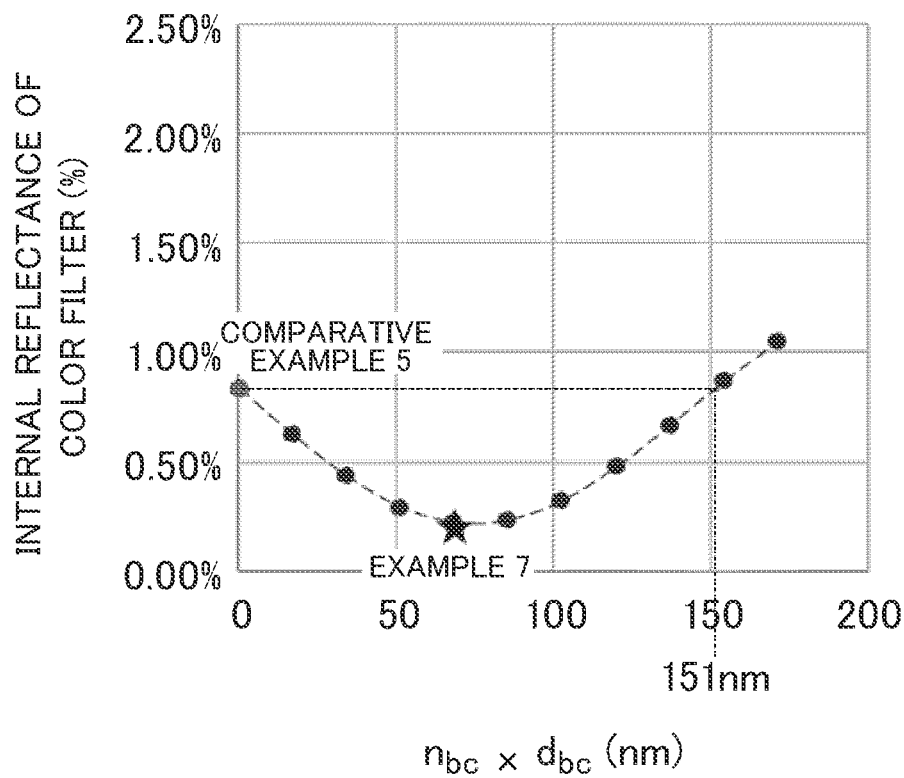
FIG. 11 is graph of the internal reflectance of a color filter when the thickness of a transparent base coat layer was changed under the condition of a color filter made in Example 7.
Figure 12:
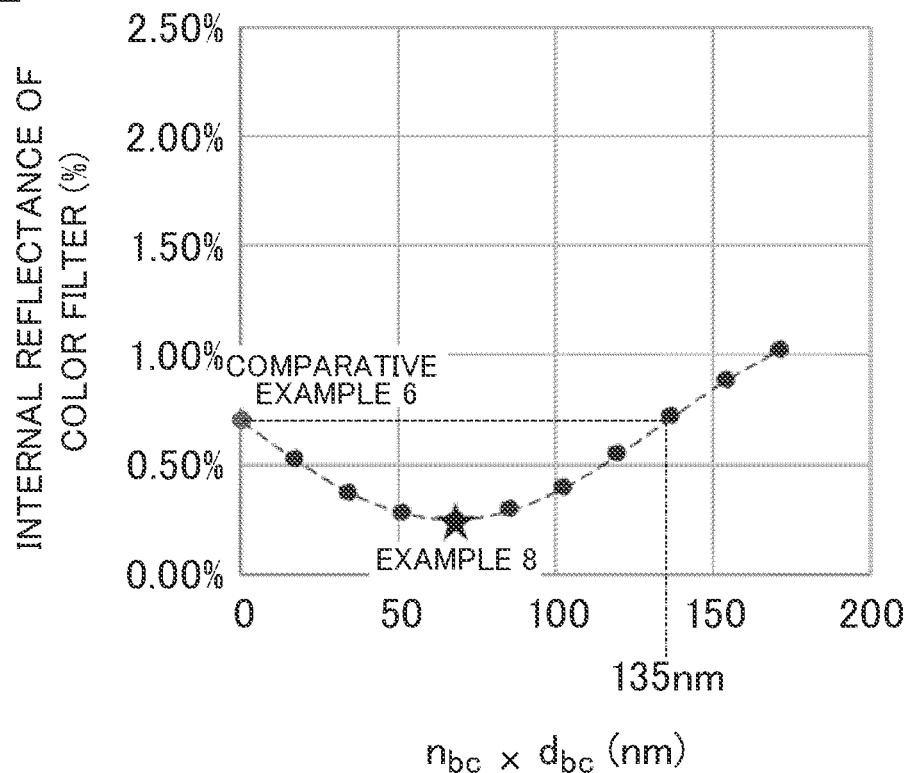
FIG. 12 is graph of the internal reflectance of a color filter when the thickness of a transparent base coat layer was changed under the condition of a color filter made in Example 8.
Figure 13:
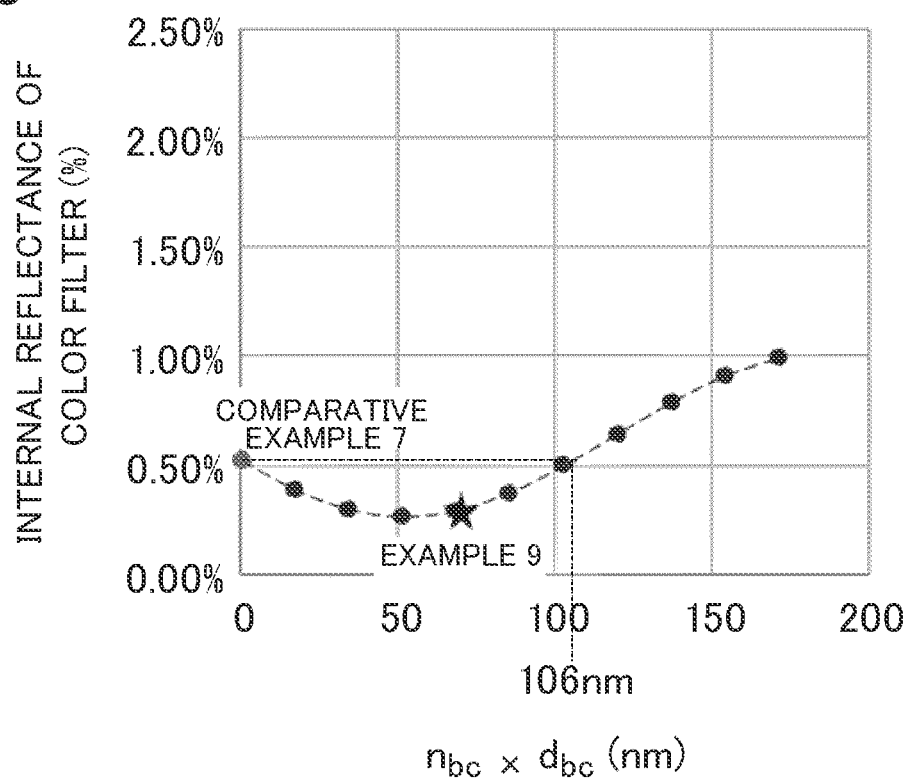
FIG. 13 is graph of the internal reflectance of a color filter when the thickness of a transparent base coat layer was changed under the condition of a color filter made in Example 9.
Figure 14:
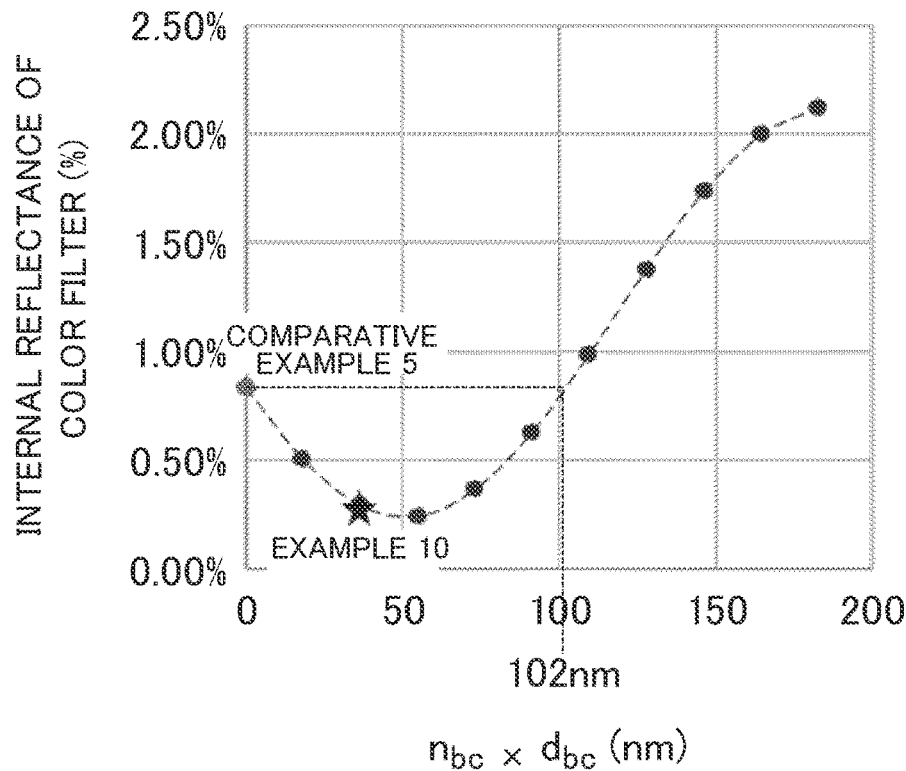
FIG. 14 is graph of the internal reflectance of a color filter when the thickness of a transparent base coat layer was changed under the condition of a color filter made in Example 10.
Figure 15:
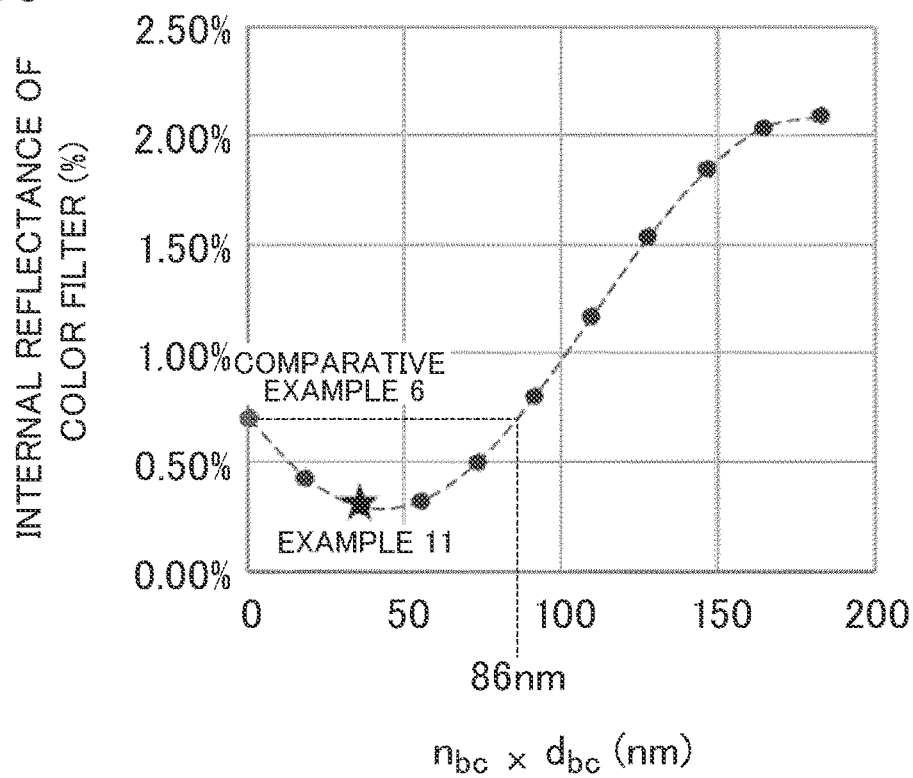
FIG. 15 is graph of the internal reflectance of a color filter when the thickness of a transparent base coat layer was changed under the condition of a color filter made in Example 11.
Figure 16:
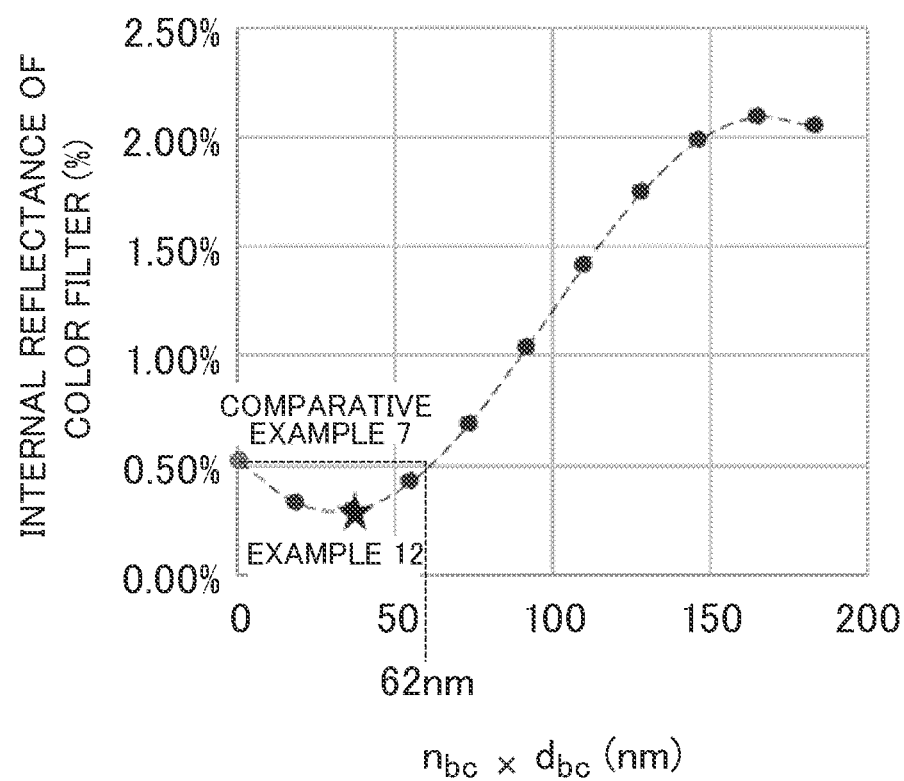
FIG. 16 is graph of the internal reflectance of a color filter when the thickness of a transparent base coat layer was changed under the condition of a color filter made in Example 12.

An ordinary FFS-mode liquid crystal panel including a color filter made in the same way as in "(1) Making of Color Filter" was made. FIG. 4 is a schematic sectional view of the liquid crystal panel that was made. The liquid crystal panel had a configuration such that a polarizing plate 12 and an ITO 13 were stacked on the substrate side of the color filter 1 and the photospacer 9, a liquid crystal layer 14, a TFT substrate 15, and a polarizing plate 12 were stacked on the film-surface side of the color filter 1. The ITO 13 was a transparent electrode for suppressing electrification and blocking electromagnetic radiation. For the obtained liquid crystal panel, the reflectance of the liquid crystal panel was measured under the SCI (specular component include) condition by using a spectrophotometer (CM-2600d, made by KONICA MINOLTA, INC.). The internal reflectance of the color filter was calculated by subtracting the surface reflectance of the glass substrate obtained in "(3) Measurement of Internal Reflectance of Color Filter" from the obtained reflectance.

EXAMPLES 2 TO 12, COMPARATIVE
EXAMPLES 1 TO 7

Color filters and liquid crystal panels were made in the same way as in Example 1 except that the opening ratio of the color filter, the configuration of the transparent base coat layer, and the material of the light-blocking layer were changed as shown in Tables 1 and 2. The microreflectance of each color filter, the internal reflectance of each color filter, and the internal reflectance of each liquid crystal panel were measured. Resin B of the light-blocking layer was a resin in which 50 parts by weight of a carbon black material and 50 parts by weight of an epoxy acrylate resin were mixed and kneaded, and the refractive index of the resin B was 1.80 at a wavelength of 550 nm.

FIGS. 5 to 16 are each a graph of the internal reflectance of the color filter when the thickness of the transparent base coat layer was changed under the conditions of the opening ratio, the type of the base coat layer, and the type and the thickness of the light-blocking layer in a corresponding one of the Examples. The horizontal axis represents $n_{bc} \times d_{bc}$, the vertical axis represents the internal reflectance of the color filter, and the numerical value on the broken line of each graph indicates $n_{bc} \times d_{bc}$ when the internal reflectance becomes the same as the internal reflectance of a color filter that does not have the transparent base coat layer.

It should be understood by those skilled in the art that various modifications, combinations, sub-combinations, and alterations may occur depending on design requirements and other factors insofar as they are within the scope of the appended claims or the equivalents thereof.

TABLE 1

| | | | Example 1 | Example 2 | Example 3 | Example 4 | Example 5 | Example 6 |
|---|---|---|---|---|---|---|---|---|
| Opening Ratio (%) | | | 35 | 50 | 70 | 35 | 50 | 70 |
| Transparent Base Coat Layer | Material | | SiON | SiON | SiON | SiNx | SiNx | SiNx |
| | Refractive Index $n_{bc}$ ($\lambda$ = 550 nm) | | 1.71 | 1.71 | 1.71 | 1.83 | 1.83 | 1.83 |
| | Extinction Coefficient $k_{bc}$ ($\lambda$ = 550 nm) | | 0.00 | 0.00 | 0.00 | 0.00 | 0.00 | 0.00 |
| | Film Thickness $d_{bc}$ [nm] | | 40 | 40 | 40 | 20 | 20 | 20 |
| Light-Blocking Layer | Material | | Resin A | Resin A | Resin A | Resin A | Resin A | Resin A |
| | Refractive Index n ($\lambda$ = 550 nm) | | 1.76 | 1.76 | 1.76 | 1.76 | 1.76 | 1.76 |
| | Extinction Coefficient k ($\lambda$ = 550 nm) | | 0.3 | 0.3 | 0.3 | 0.3 | 0.3 | 0.3 |
| | Film Thickness $d_{bm}$ [μm] | | 2.0 | 2.0 | 2.0 | 2.0 | 2.0 | 2.0 |
| $n_{bc} \times d_{bc}$ [nm] | | | 68.4 | 68.4 | 68.4 | 36.6 | 36.6 | 36.6 |
| $\alpha \times A^2 + \beta \times A + \gamma$ | | | 142.3 | 128.3 | 103.4 | 92.5 | 79.5 | 59.5 |
| Microreflectance of Color Filter | Frame Portion | Substrate Side | 0.16% | 0.16% | 0.16% | 0.24% | 0.24% | 0.24% |
| | | Film Surface Side | 1.17% | 1.17% | 1.17% | 1.17% | 1.17% | 1.17% |
| | Opening Portion (Red Color Resist Layer) | Substrate Side | 0.24% | 0.24% | 0.24% | 0.32% | 0.32% | 0.32% |
| | | Film Surface Side | 0.59% | 0.59% | 0.59% | 0.59% | 0.59% | 0.59% |
| | Opening Portion (Green Color Resist Layer) | Substrate Side | 0.35% | 0.35% | 0.35% | 0.36% | 0.36% | 0.36% |
| | | Film Surface Side | 0.07% | 0.07% | 0.07% | 0.07% | 0.07% | 0.07% |
| | Opening Portion (Blue Color Resist Layer) | Substrate Side | 0.46% | 0.46% | 0.46% | 0.22% | 0.22% | 0.22% |
| | | Film Surface Side | 0.10% | 0.10% | 0.10% | 0.10% | 0.10% | 0.10% |

TABLE 1-continued

| | | | | | | | |
|---|---|---|---|---|---|---|---|
| Internal Reflectance of Color Filter | | 0.23% | 0.26% | 0.29% | 0.26% | 0.27% | 0.28% |
| Internal Reflectance of Liquid Crystal Panel | | 0.57% | 0.58% | 0.60% | 0.59% | 0.59% | 0.59% |

| | | | Comparative Example 1 | Comparative Example 2 | Comparative Example 3 | Comparative Example 4 |
|---|---|---|---|---|---|---|
| Opening Ratio (%) | | | 35 | 50 | 50 | 70 |
| Transparent Base Coat Layer | Material | | (none) | (none) | SiON | (none) |
| | Refractive Index $n_{bc}$ ($\lambda$ = 550 nm) | | — | — | 1.71 | — |
| | Extinction Coefficient $k_{bc}$ ($\lambda$ = 550 nm) | | — | — | 0.00 | — |
| | Film Thickness $d_{bc}$ [nm] | | — | — | 80 | — |
| Light-Blocking Layer | Material | | Resin A | Resin A | Resin A | Resin A |
| | Refractive Index n ($\lambda$ = 550 nm) | | 1.76 | 1.76 | 1.76 | 1.76 |
| | Extinction Coefficient k ($\lambda$ = 550 nm) | | 0.3 | 0.3 | 0.3 | 0.3 |
| | Film Thickness $d_{bm}$ [µm] | | 2.0 | 2.0 | 2.0 | 2.0 |
| $n_{bc} \times d_{bc}$ [nm] | | | 0.0 | 0.0 | 136.8 | 0.0 |
| $\alpha \times A^2 + \beta \times A + \gamma$ | | | — | — | 128.3 | — |
| Microreflectance of Color Filter | Frame Portion | Substrate Side | 1.17% | 1.17% | 0.71% | 1.17% |
| | | Film Surface Side | 1.17% | 1.17% | 1.17% | 1.17% |
| | Opening Portion (Red Color Resist Layer) | Substrate Side | 0.59% | 0.59% | 0.60% | 0.59% |
| | | Film Surface Side | 0.59% | 0.59% | 0.59% | 0.59% |
| | Opening Portion (Green Color Resist Layer) | Substrate Side | 0.07% | 0.07% | 0.78% | 0.07% |
| | | Film Surface Side | 0.07% | 0.07% | 0.07% | 0.07% |
| | Opening Portion (Blue Color Resist Layer) | Substrate Side | 0.10% | 0.10% | 1.30% | 0.10% |
| | | Film Surface Side | 0.10% | 0.10% | 0.10% | 0.10% |
| Internal Reflectance of Color Filter | | | 0.85% | 0.71% | 0.80% | 0.53% |
| Internal Reflectance of Liquid Crystal Panel | | | 0.81% | 0.76% | 0.79% | 0.69% |

TABLE 2

| | | Example 7 | Example 8 | Example 9 | Example 10 | Example 11 |
|---|---|---|---|---|---|---|
| Opening Ratio (%) | | 35 | 50 | 70 | 35 | 50 |
| Transparent Base Coat Layer | Material | SiON | SiON | SiON | SiNx | SiNx |
| | Refractive Index $n_{bc}$ ($\lambda$ = 550 nm) | 1.71 | 1.71 | 1.71 | 1.83 | 1.83 |
| | Extinction Coefficient $k_{bc}$ ($\lambda$ = 550 nm) | 0 | 0 | 0 | 0 | 0 |
| | Film Thickness $d_{bc}$ [nm] | 40 | 40 | 40 | 20 | 20 |
| Light-Blocking Layer | Material | Resin B | Resin B | Resin B | Resin B | Resin B |
| | Refractive Index n ($\lambda$ = 550 nm) | 1.8 | 1.8 | 1.8 | 1.8 | 1.8 |
| | Extinction Coefficient k ($\lambda$ = 550 nm) | 0.26 | 0.26 | 0.26 | 0.26 | 0.26 |
| | Film Thickness $d_{bm}$ [µm] | 2 | 2 | 2 | 2 | 2 |
| $n_{bc} \times d_{bc}$ [nm] | | 68.4 | 68.4 | 68.4 | 36.6 | 36.6 |
| $\alpha \times A^2 + \beta \times A + \gamma$ | | 142.3 | 128.3 | 103.4 | 92.5 | 79.5 |

TABLE 2-continued

| | | | | | | | |
|---|---|---|---|---|---|---|---|
| Microreflectance of Color Filter | Frame Portion | Substrate Side | 0.16% | 0.16% | 0.16% | 0.29% | 0.29% |
| | | Film Surface Side | 1.15% | 1.15% | 1.15% | 1.15% | 1.15% |
| | Opening Portion (Red Color Resist Layer) | Substrate Side | 0.24% | 0.24% | 0.24% | 0.32% | 0.32% |
| | | Film Surface Side | 0.59% | 0.59% | 0.59% | 0.59% | 0.59% |
| | Opening Portion (Green Color Resist Layer) | Substrate Side | 0.35% | 0.35% | 0.35% | 0.36% | 0.36% |
| | | Film Surface Side | 0.07% | 0.07% | 0.07% | 0.07% | 0.07% |
| | Opening Portion (Blue Color Resist Layer) | Substrate Side | 0.46% | 0.46% | 0.46% | 0.22% | 0.22% |
| | | Film Surface Side | 0.10% | 0.10% | 0.10% | 0.10% | 0.10% |
| Internal Reflectance of Color Filter | | | 0.22% | 0.25% | 0.29% | 0.29% | 0.29% |
| Internal Reflectance of Liquid Crystal Panel | | | 0.57% | 0.58% | 0.60% | 0.60% | 0.60% |

| | | | Example 12 | Comparative Example 5 | Comparative Example 6 | Comparative Example 7 |
|---|---|---|---|---|---|---|
| Opening Ratio (%) | | | 70 | 35 | 50 | 70 |
| Transparent Base Coat Layer | Material | | SiN$x$ | (none) | (none) | (none) |
| | Refractive Index $n_{bc}$ ($\lambda$ = 550 nm) | | 1.83 | — | — | — |
| | Extinction Coefficient $k_{bc}$ ($\lambda$ = 550 nm) | | 0 | — | — | — |
| | Film Thickness $d_{bc}$ [nm] | | 20 | — | — | — |
| Light-Blocking Layer | Material | | Resin B | Resin B | Resin B | Resin B |
| | Refractive Index n ($\lambda$ = 550 nm) | | 1.8 | 1.8 | 1.8 | 1.8 |
| | Extinction Coefficient k ($\lambda$ = 550 nm) | | 0.26 | 0.26 | 0.26 | 0.26 |
| | Film Thickness $d_{bm}$ [μm] | | 2 | 2 | 2 | 2 |
| $n_{bc} \times d_{bc}$ [nm] | | | 36.6 | 0 | 0 | 0 |
| $\alpha \times A^2 + \beta \times A + \gamma$ | | | 59.5 | — | — | — |
| Microreflectance of Color Filter | Frame Portion | Substrate Side | 0.29% | 1.15% | 1.15% | 1.15% |
| | | Film Surface Side | 1.15% | 1.15% | 1.15% | 1.15% |
| | Opening Portion (Red Color Resist Layer) | Substrate Side | 0.32% | 0.59% | 0.59% | 0.59% |
| | | Film Surface Side | 0.59% | 0.59% | 0.59% | 0.59% |
| | Opening Portion (Green Color Resist Layer) | Substrate Side | 0.36% | 0.07% | 0.07% | 0.07% |
| | | Film Surface Side | 0.07% | 0.07% | 0.07% | 0.07% |
| | Opening Portion (Blue Color Resist Layer) | Substrate Side | 0.22% | 0.10% | 0.10% | 0.10% |
| | | Film Surface Side | 0.10% | 0.10% | 0.10% | 0.10% |
| Internal Reflectance of Color Filter | | | 0.30% | 0.84% | 0.70% | 0.52% |
| Internal Reflectance of Liquid Crystal Panel | | | 0.60% | 0.81% | 0.76% | 0.69% |

What is claimed is:

1. A color filter comprising:
   a transparent substrate;
   a transparent base coat layer stacked on the transparent substrate;
   a light-blocking layer partially stacked on the transparent base coat layer;
   a color resist layer stacked on the light-blocking layer and on the transparent base coat layer in a region in which the light-blocking layer is not present; and
   an overcoat layer stacked on the light-blocking layer and on the color resist layer,
   wherein the color filter includes
      a frame portion in which the transparent base coat layer and the light-blocking layer are stacked on the transparent substrate and the color resist layer is not stacked, and
      an opening portion in which the transparent base coat layer and the color resist layer are stacked on the transparent substrate and the light-blocking layer is not stacked,
   wherein, in the frame portion, a reflectance of light incident from the transparent substrate side is less than a reflectance of light incident from the overcoat layer side,
   wherein, in the opening portion of at least one color in the color resist layer, a reflectance of light incident from the transparent substrate side is greater than a reflectance of light incident from the overcoat layer side, and
   wherein the color filter satisfies the following expression (1)

$$n_{bc} \times d_{bc} < \alpha \times A^2 + \beta \times A + \gamma \quad (1)$$

where $n_{bc}$ is a refractive index of the transparent base coat layer, $d_{bc}$ nm is a film thickness of the transparent base coat layer, and A is an opening ratio of the color filter, and where A, α, β, and γ respectively satisfy the following expressions $$A = \text{(area of the opening portion)/(area of an active area)},$$

$$\alpha = 436.7 \times n_{bc} - 837.2,$$

$$\beta = -315.8 \times n_{bc} + 523.7, \text{ and}$$

$$\gamma = -358.3 \times n_{bc} + 771.8.$$

2. The color filter according to claim 1, wherein the refractive index of the transparent base coat layer is greater than or equal to 1.71 and less than or equal to 1.83.

3. The color filter according to claim 1, wherein the transparent base coat layer contains silicon oxynitride or silicon nitride.

4. The color filter according to claim 1, wherein a refractive index of the light-blocking layer is greater than or equal to 1.76 and less than or equal to 1.80.

5. A liquid crystal display device, comprising the color filter according to claim 1.

* * * * *